United States Patent
Nanja

(10) Patent No.: US 9,110,725 B1
(45) Date of Patent: *Aug. 18, 2015

(54) USER INTERFACE FOR DYNAMIC ENVIRONMENT USING ALLOCATEABLE RESOURCES

(75) Inventor: Sekaran Nanja, San Jose, CA (US)

(73) Assignee: Clouding Corp., Los Angeles, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/277,038

(22) Filed: Nov. 24, 2008

Related U.S. Application Data

(63) Continuation of application No. 11/492,332, filed on Jul. 25, 2006, now Pat. No. 7,457,944, which is a continuation of application No. 09/663,252, filed on Sep. 15, 2000, now Pat. No. 7,082,521.

(60) Provisional application No. 60/228,105, filed on Aug. 24, 2000.

(51) Int. Cl.
*G06F 15/177* (2006.01)
*G06F 9/50* (2006.01)
*H04L 12/24* (2006.01)

(52) U.S. Cl.
CPC .......... *G06F 9/5061* (2013.01); *H04L 41/0253* (2013.01); *H04L 41/0806* (2013.01); *H04L 41/0889* (2013.01); *H04L 41/22* (2013.01)

(58) Field of Classification Search
CPC ........... G06F 9/44; G06F 9/50; G06F 9/5061; H04L 41/22; H04L 41/08; H04L 41/0253; H04L 41/0806; H04L 41/0889
USPC .............................. 713/1, 100; 717/168–178; 718/104–106; 705/26, 27
See application file for complete search history.

(56) References Cited

U.S. PATENT DOCUMENTS

| | | | |
|---|---|---|---|
| 4,925,311 A | 5/1990 | Neches et al. | 364/200 |
| 5,191,611 A | 3/1993 | Lang | 380/25 |
| 5,394,522 A | 2/1995 | Sanchez-Frank et al. | 395/159 |
| 5,410,707 A | 4/1995 | Bell | 395/700 |
| 5,418,918 A | 5/1995 | Vander Kamp et al. | 395/375 |

(Continued)

FOREIGN PATENT DOCUMENTS

| | | | |
|---|---|---|---|
| EP | 745929 | 12/1996 | G06F 3/12 |
| EP | 841616 | 5/1998 | G06F 9/445 |

OTHER PUBLICATIONS

Clive Debenham, "Taos: The operating system," Mar. 1995, Newsgroups: comp.parallel, pp. 1-8.

(Continued)

*Primary Examiner* — Thuan Du
(74) *Attorney, Agent, or Firm* — Ascenda Law Group, PC

(57) ABSTRACT

The present invention discloses user interface for creating a dynamic computing environment using allocateable resources. The interface enables the fast, efficient selection and configuration of processing resources for the computing environment. The resources are fully selectable and allocable by a system architect. In a first embodiment, a primary company, Design2Deploy, Inc.® provides the ability for a customer or system architect to design a system by allocating resources and specifying how the resources are to be used. The system architect may create a computing environment from a remotely-accessible user interface such as a web page on the Internet. Thus, the system architect can create, modify and operate the environment from anywhere in the world.

31 Claims, 5 Drawing Sheets

(56) References Cited

U.S. PATENT DOCUMENTS

| | | | |
|---|---|---|---|
| 5,421,009 A | 5/1995 | Platt | 709/221 |
| 5,452,454 A | 9/1995 | Basu | 395/700 |
| 5,463,766 A | 10/1995 | Schieve et al. | 395/650 |
| 5,479,599 A | 12/1995 | Rockwell et al. | 395/155 |
| 5,515,524 A | 5/1996 | Lynch et al. | 395/500 |
| 5,555,370 A | 9/1996 | Li et al. | 395/161 |
| 5,577,210 A | 11/1996 | Abdous et al. | 395/200.1 |
| 5,668,995 A | 9/1997 | Bhat | 395/674 |
| 5,694,600 A | 12/1997 | Khenson et al. | 395/652 |
| 5,727,213 A | 3/1998 | Vander Kamp et al. | 395/681 |
| 5,752,041 A * | 5/1998 | Fosdick | 717/178 |
| 5,802,290 A | 9/1998 | Casselman | 395/200.31 |
| 5,842,011 A | 11/1998 | Basu | 395/652 |
| 5,864,699 A * | 1/1999 | Merryman | 718/104 |
| 5,894,571 A | 4/1999 | O'Connor | 395/652 |
| 5,942,738 A | 8/1999 | Cesaire et al. | 235/380 |
| 5,948,101 A | 9/1999 | David et al. | 713/2 |
| 5,974,443 A | 10/1999 | Jeske | 709/202 |
| 5,974,547 A | 10/1999 | Klimenko | 713/2 |
| 6,002,871 A | 12/1999 | Duggan et al. | 395/704 |
| 6,009,507 A | 12/1999 | Brooks et al. | 712/28 |
| 6,058,113 A | 5/2000 | Chang | 370/390 |
| 6,081,846 A | 6/2000 | Hyder et al. | 709/250 |
| 6,081,864 A | 6/2000 | Lowe et al. | 710/129 |
| 6,085,318 A | 7/2000 | Vander Kamp et al. | 713/1 |
| 6,092,189 A | 7/2000 | Fisher et al. | 713/1 |
| 6,098,067 A | 8/2000 | Erickson | 707/10 |
| 6,101,601 A | 8/2000 | Matthews et al. | 713/2 |
| 6,122,738 A | 9/2000 | Millard | 713/187 |
| 6,182,123 B1 | 1/2001 | Filepp et al. | 709/217 |
| 6,182,275 B1 | 1/2001 | Beelitz et al. | 717/1 |
| 6,189,100 B1 | 2/2001 | Barr et al. | 713/182 |
| 6,192,518 B1 | 2/2001 | Neal | 717/11 |
| 6,202,091 B1 | 3/2001 | Godse | 709/222 |
| 6,230,200 B1 | 5/2001 | Forecast et al. | 709/226 |
| 6,259,448 B1 | 7/2001 | McNally et al. | 345/348 |
| 6,262,726 B1 | 7/2001 | Stedman et al. | 345/333 |
| 6,266,678 B1 | 7/2001 | McDevitt et al. | 707/201 |
| 6,282,709 B1 | 8/2001 | Reha et al. | 717/11 |
| 6,298,443 B1 | 10/2001 | Colligan et al. | 713/200 |
| 6,304,965 B1 | 10/2001 | Rickey | 713/2 |
| 6,308,238 B1 | 10/2001 | Smith et al. | 710/129 |
| 6,370,560 B1 | 4/2002 | Robertazzi et al. | 709/105 |
| 6,374,336 B1 | 4/2002 | Peters et al. | 711/167 |
| 6,393,557 B1 | 5/2002 | Guthridge et al. | 713/1 |
| 6,421,777 B1 | 7/2002 | Pierre-Louis et al. | 713/2 |
| 6,446,126 B1 | 9/2002 | Huang et al. | 709/226 |
| 6,463,530 B1 | 10/2002 | Sposato | 713/2 |
| 6,466,972 B1 | 10/2002 | Paul et al. | 709/222 |
| 6,466,978 B1 | 10/2002 | Mukherjee et al. | 709/225 |
| 6,477,624 B1 | 11/2002 | Kedem et al. | 711/147 |
| 6,490,564 B1 | 12/2002 | Dodrill et al. | 704/275 |
| 6,493,679 B1 | 12/2002 | Rappaport et al. | 705/29 |
| 6,498,791 B2 | 12/2002 | Pickett et al. | 370/353 |
| 6,512,526 B1 | 1/2003 | McGothlin et al. | 345/762 |
| 6,539,456 B2 | 3/2003 | Stewart | 711/113 |
| 6,543,047 B1 | 4/2003 | Vrhel, Jr. et al. | 717/121 |
| 6,550,006 B1 | 4/2003 | Khanna | 713/2 |
| 6,560,606 B1 | 5/2003 | Young | 707/100 |
| 6,564,112 B1 | 5/2003 | Factor | 700/97 |
| 6,577,229 B1 | 6/2003 | Bonneau et al. | 340/10.41 |
| 6,578,076 B1 | 6/2003 | Putzolu | 709/223 |
| 6,578,141 B2 | 6/2003 | Kelley et al. | 713/1 |
| 6,598,131 B2 | 7/2003 | Kedem et al. | 711/147 |
| 6,601,095 B1 | 7/2003 | Duffield et al. | 709/222 |
| 6,601,166 B1 | 7/2003 | Ayyar et al. | 713/2 |
| 6,604,238 B1 | 8/2003 | Lim et al. | 717/177 |
| 6,615,365 B1 | 9/2003 | Jenevein et al. | 714/6 |
| 6,633,916 B2 | 10/2003 | Kauffman | 709/229 |
| 6,662,267 B2 | 12/2003 | Stewart | 711/113 |
| 6,668,327 B1 | 12/2003 | Prabandham et al. | 713/201 |
| 6,684,327 B1 | 1/2004 | Anand et al. | 713/2 |
| 6,711,668 B1 | 3/2004 | Wojcieszak et al. | 712/207 |
| 6,748,525 B1 | 6/2004 | Hubacher et al. | 713/1 |
| 6,751,662 B1 | 6/2004 | Natarajan et al. | 709/223 |
| 6,757,837 B1 | 6/2004 | Platt et al. | 714/4 |
| 6,768,901 B1 | 7/2004 | Osborn et al. | 455/230 |
| 6,802,062 B1 | 10/2004 | Oyamada et al. | 718/1 |
| 6,804,774 B1 | 10/2004 | Larvoire et al. | 713/2 |
| 6,810,478 B1 | 10/2004 | Anand et al. | 713/2 |
| 7,058,700 B1 | 6/2006 | Casalaina | 709/220 |
| 7,065,637 B1 | 6/2006 | Nanja | 713/1 |
| 7,082,521 B1 | 7/2006 | Nanja | 713/1 |
| 2001/0011304 A1 | 8/2001 | Wesinger, Jr. et al. | 709/227 |
| 2002/0069369 A1 | 6/2002 | Tremain | 713/201 |
| 2002/0172222 A1 | 11/2002 | Ullmann et al. | 370/468 |
| 2003/0009552 A1 | 1/2003 | Benfield et al. | 709/224 |
| 2003/0046529 A1 | 3/2003 | Loison et al. | 713/2 |
| 2004/0054780 A1 | 3/2004 | Romero | 709/226 |
| 2005/0021723 A1 | 1/2005 | Saperia | 709/223 |

OTHER PUBLICATIONS

Application Developer's Training Course, SNAP 8.0 Training Participant Guide, Module 7, Copyright © 1997, Template Software, Inc., pp. 7-1 through 7-34.

Workflow Template, Developing A WFT Workflow System, Copyright © 1998, Template Software, Inc.

Workflow Template, Using the WFT Development Environment, Copyright © 1998, Template Software, Inc.

Web Component, Using the Web Component, Copyright © 1997, Template Software, Inc.

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.

Henry, Mike, Intel Corporation, *Extending PXE to Mobile Platforms*, Jun. 1998, pp. 1-4, http://www.intel.com/update/archive/psn/psn06985.pdf.

International Search Report as mailed from the PCT on Aug. 13, 2004 for WO Application (PCT/US03/28820; Filed Sep. 10, 2003), 3 pages).

Simon, "Computer System Built to Order", Nov. 25, 1996—Newsgroups: demon.adverts, midlands.adverts, sanet.adverts, solent.forsale, uk.adverts.computer, unet.adverts, uk.adverts.other, dungeon.forsale.

Fabio Kon et al., "Dependence Management in Compnent-Based Distributed Systems", Mar. 2000, pp. 26-36.

* cited by examiner

USER INTERFACE FOR DYNAMIC ENVIRONMENT USING ALLOCATEABLE RESOURCES

CROSS-REFERENCES TO RELATED APPLICATIONS

This application is a continuation of U.S. application Ser. No. 11/492,332, filed on Jul. 25, 2006 (issued on Nov. 25, 2008 as U.S. Pat. No. 7,457,944), which is a continuation of U.S. application Ser. No. 09/663,252 (issued as U.S. Pat. No. 7,082,521, entitled "User Interface For Dynamic Computing Environment Using Allocateable Resources", issued on Jul. 25, 2006, and naming Sekaran Nanja as the inventor), which claims priority from U.S. Provisional Application No. 60/228,105, entitled "Dynamic Computing Environment Using Allocateable Resources," filed on Aug. 24, 2000, and is related to U.S. Pat. No. 7,065,637, entitled "System for Configuration of Dynamic Computing Environment Using a Visual Interface", issued on Jun. 20, 2006. These applications and their disclosures are incorporated herein by reference for all purposes.

BACKGROUND OF THE INVENTION

The present invention relates in general to information processing, and more specifically to a system for allowing allocation of resources such as digital processors, networks and software to create a software configured, networked arrangement of processors and processes.

Today, computers are increasingly being used in almost every area of commerce, education, entertainment and productivity. With the growing popularity of the Internet, corporate and campus intranets, home networking and other networks, the trend is to use multiple computers, or processing platforms, to perform tasks and provide services. The networked processors approach is in contrast to traditional approaches of running a single application as a stand-alone application on a single computer.

One approach to networked processing is a "client-server" model whereby a server computer on the Internet is used to transfer information to a client computer. Typically, the client computer is located at an end user's location, such as a personal computer in a user's home. This allows large amounts of information to be stored in, and accessed from, the server computer by many client computers. The client computers can access the server computer simultaneously. Another approach allows a user to obtain portions of executable programs from the server to operate an application program in functional "pieces" or components, on the client computer. For example, a user can run a word-processing program in a client-server mode where the server provides only those portions of the word-processing software to the user's computer on an as-needed basis.

Yet another model is the application service provider (ASP) model. This removes the application still further from the end-user and can involve more processors, such as servers. The ASP model allows a primary server to host a client-server application, or to host any type of data-processing resource such as a database, user interface, program component, data object, etc. The application can appear to the client as being hosted by the primary server when it is actually being provided by one or more other servers. The other servers can provide the application, or components, by having the client directly access the other server, or having the client access the other server through the primary server.

Still other models are possible. Any arbitrary arrangement of processors can be used to provide a service or function to an end user, or to another device such as another processor, consumer electronic device, etc. Examples of such systems are groups of computers used to perform a large mathematical task, such as rendering frames of a video sequence or performing a simulation. Systems that use many processors to exchange information, such as email systems, multicasting programs, voice-over-IP communications, etc., can potentially require hundreds, or even thousands or more, networked processors.

Software is necessary to operate each of these models. Each of the systems described above will likely use multiple software processes on each processing platform. Most likely, the software processes are designed by different software manufacturers. Although there are standard specifications to design compatible software, such software is still designed largely independently of other manufacturers' software. For example, a user may be running an operating system and web browser designed by different companies. Additional processes may be concurrently executing on the user's computer.

Thus, many independently-designed hardware devices and software processes must be coordinated in order for the overall networked system to operate correctly and efficiently. This complexity is multiplied by the number of users that the system is designed to support. For example, where the system is an Internet system it is common for the user base to be in the hundreds of thousands, or millions. There may be hundreds or thousands (or more) simultaneous users operating client processing systems that require tens, or even hundreds, of servers for adequate bandwidth. Different servers in the networked system may perform different functions such as web page serving, database maintenance, caching, etc.

This complexity further manifests itself in another aspect. In the past, software applications used to be monolithic. That is, the application was self-contained within a box with no interaction with other applications. However, this paradigm is no longer true. With Internet and e-commerce applications, for example, a client application is configured to talk to a remotely located server application such as eBay.com®, or Amazon.com®, for example. Typically, e-commerce applications define a three-tier architecture which includes: (1) client; (2) server; and (3) database. Within this architecture, the client may be running an Intel® box with a Microsoft Windows 86XX® environment, the server may be running a Sun Microsystems® box running an iPlanet™ application, the database may be Sun Microsystems® box running Oracle®, for example. Therefore, this three-tiered architecture increases the complexity and cost of many software applications. In one aspect, the complexity of today's computing environments increases computing costs, and extends the time for a new product to reach the market.

A major problem arises where companies need to design and test software and hardware for use in such large and complex systems. Because today's applications are multi-tiered, it is no longer sufficient to test an application within a box. Not only must compatible hardware be selected, obtained, connected and tested; but each piece of software must be selected in accordance with hardware requirements, obtained (usually by complex multi-licensing arrangements), installed, configured and tested. Finally, in order to test the system at anywhere near operating capacity, many human testers may need to be hired to analyze and exercise the system. Often, the task of adequately testing such systems is the single largest expense in designing and developing software. On the other hand, such testing is vitally important to ensure the reliability and success of new software and hardware.

Thus, it is desirable to provide a system and an associated user interface for overcoming the aforementioned problems and which provides advantages over the prior art.

SUMMARY OF THE INVENTION

The present invention discloses user interface for creating a dynamic computing environment using allocateable resources. The interface enables the fast, efficient selection and configuration of processing resources for the computing environment. The resources are fully selectable and allocable by a system architect. In a first embodiment, a primary company, Design2Deploy, Inc.® provides the ability for a customer or system architect to design a system by allocating resources and specifying how the resources are to be used. The system architect may create a computing environment from a remotely-accessible user interface such as a web page on the Internet. Thus, the system architect can create, modify and operate the environment from anywhere in the world.

One embodiment of the present invention provides a method for allocating processing resources, the method using a processor coupled to a display device and to a user input device. The method includes, displaying a list of processing resources on the display device; accepting signals from the user input device to indicate the configuration of at least a portion of the processing resources; and configuring the selected processing resource.

An alternate embodiment of the present invention discloses a system for providing configurable resources to achieve a processing environment. The system includes a configurable communication link; a plurality of processing devices coupled to the communication link; and a plurality of software programs coupled to the processing devices. A further embodiment of the present invention discloses a method for creating a computing environment by using a computer user interface. The computer user interface coupled to a display screen and to an input device for generating signals in response to interactions of a user. The method includes, accepting a first signal from the input device which enables the user to specify a type of operating system for use in the computing environment; accepting a second signal from the input device which enables the user to specify a type of processor for use within the computing environment; activating an operating system of the specified type to run in the computing environment; and activating a processor of the specified type to run in the computing environment.

Advantageously, the present invention facilitates the creation of a computing environment on-demand by the customer, and since the computing environment, in turn, can be coupled over networks, including the Internet, this approach eliminates the cost of shipping hardware and software.

DETAILED DESCRIPTION OF THE DRAWINGS

Figure 1:
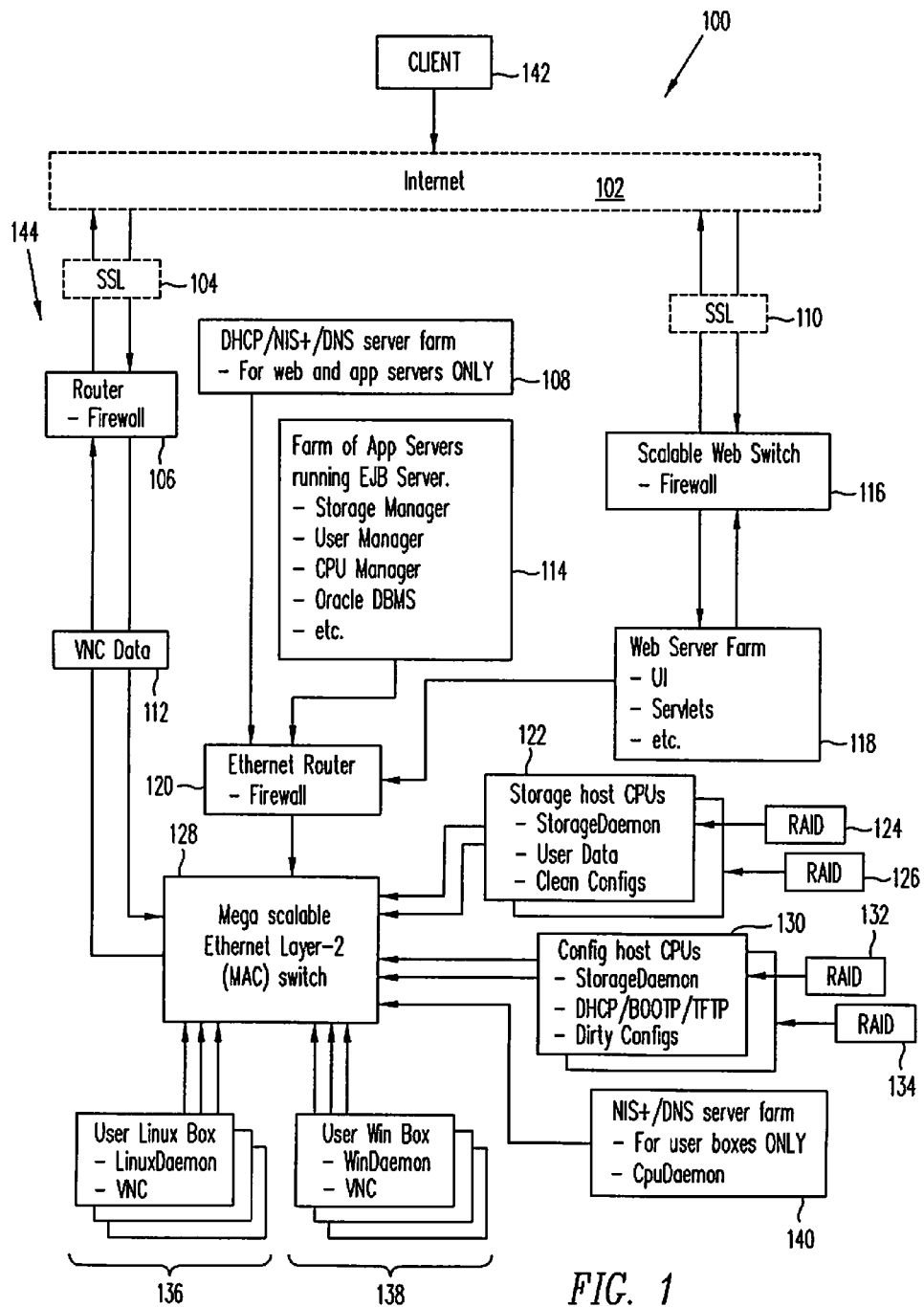
FIG. 1 is a block diagram of a system for allocating processing resources according to the present invention.

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention allows fast, efficient selection and configuration of processing networks. The processing network is referred to as a system including "resources." A system resource is any hardware, software or communication components in the system. For example, discrete hardware devices include processing platforms such as computers or processors, mobile/laptop computers, embedded computing devices, hand-held computers, personal digital assistants, point-of-sale terminals, smart-card devices, databases, storage devices, data transmission and routing hardware etc., without limitation. Additionally, computer peripherals such as monitors, input/output devices, disk drives, manufacturing devices, or any device capable of responding to, handling, transferring or interacting with digital data are also potential resources. Software, or any other form of instruction, is executed by processors in the system and is a type of resource. Finally, communication resources are also part of the system such as a digital network's hardware, the network configuration and topology, and network control as provided by software or hardware.

The resources are fully selectable and allocable by a system architect. In a preferred embodiment, a primary company, Design2Deploy, Inc.® provides the ability for a system architect to design a system by allocating resources and specifying how the resources are to be used. The system architect can be an individual, corporate entity, etc. The system is referred to as an "environment" and the primary company is referred to as an Environment Service Provider (ESP), while the system architect is referred to as the "customer." The primary company obtains revenue for providing the resources and the tools to easily select, allocate, configure and run the environment.

Note that the preferred embodiment allows such fast allocation and configuration of resources that different environments can be created from the same resources within minutes, or even seconds. This allows "time sharing" of overall resources so that a first environment can be "alive" for a daily two-hour slot, followed by second, third and fourth environments being instantly created for the next four hours for three different customers, and so on.

A preferred embodiment allows customers to create a computing environment from a remotely-accessible user interface such as a web page on the Internet. Thus, the customer can create, modify and operate the environment from anywhere in the world. Since the resources, in turn, can be coupled over networks, including the Internet, this approach eliminates the cost of shipping hardware and software. Designers, programmers, testers or other personnel using an environment can, similarly, be located anywhere in the world so that labor costs can be optimized.

The configuration of environments is automatic. For example, a customer can request a web-site simulator using 12 web-page servers on a Microsoft® NT platform, 2 disk arrays at a specific bandwidth and storage capacity, 2 caching servers and 200 clients running Netscape Navigator™ under Microsoft Windows® 2000 using Pentium III™ processors at under 800 MHz. Such an environment is created automatically. The hardware is actually, or virtually, coupled, the software is automatically installed, and the system can be made available to 200 human testers to operate the browsers. Alternatively, testing software can be used to simulate keystrokes and mouse clicks to perform the testing role. A further understanding of embodiments of the present invention will gained with reference to the diagrams and descriptions which follow.

System Overview

A product named D2D™ is offered by a primary company, Design2Deploy, Inc.® of Mountain View, Calif.

FIG. 1 is a block diagram of D2D system 100 for allocating processing resources according to the present invention. In FIG. 1, among other components, system 100 comprises client 142, a computer network such as the Internet 102 and server system 144 which includes various components such as Secure Socket Layer (SSL) 104 and 110, for example. In a first embodiment, server system 144 is a VCE (virtual computing environment), wherein client 142 uses the Internet 102 to interact with server system 144 for the purpose of allocating resources, described below.

Server system 144 may communicate with client 142 using RFB (remote frame buffer) protocol. Other devices and software for facilitating network communications may be employed. In a preferred embodiment, client 142 interacts via SSL 104 and 110, which provide access control so that a desired level of security can be maintained. System 100 further includes a router firewall 106 and Virtual Network Computing (VNC) viewer 112 also used to monitor and control data and to provide security.

Other components of system 100 include an Ethernet switch 128 which allows different hardware components to be flexibly interconnected. For example, Linux boxes 136, Windows Boxes 138, Host Central Processing Units (CPUs) 122, Configuration Host CPUs 130, Domain Name Server (DNS) farm 140 and Redundant Array of Inexpensive Disks (RAID) arrays 124, 126, 132 and 134, can be selected and interconnected. Linux Boxes 136, Windows Boxes 138 processing units which are selectable by users of system 100 and are collectively referred to as "user machines".

Although not shown, one of ordinary skill in the art will realize that the "user machines" may include various machine and device types. For example, such devices may include mobile/laptop computers, embedded computing devices, hand-held computers, personal digital assistants, point-of-sale terminals and smart-card devices without limitation. CPU 122 runs the storage daemon, stores user data and clean configurations. Although not shown, CPU 122 may be connected behind the firewall 120. System 100 further contains other resources such as Application server farm 108, Extended Java Bean (EJB) server 114 and web server farm 118 which are interconnectable via Ethernet switch 128 through Ethernet firewall 120.

Customers' testers or other personnel can interact with the environment through SSL 110 and Web switch 116 to, for example, run client software such as a web browser, application, etc. Note that the selection and interconnection of these devices, along with other degrees of control of these devices as described in the attached documents, allows a customer to set up many sizes and types of processing architectures and environments.

It is possible to use widely-varying components, or resources, than those shown in FIG. 1 to adequately implement the invention. The specific hardware and interconnections of FIG. 1 are but one example of an architecture for providing allocable resources. Although not shown, system 100 need not include internet 102. In an exemplary embodiment, system 100 comprises a collection of one or wired or wireless networks which are not connected to the Internet. In a first embodiment, the present invention permits "virtual" hosting of computing environments. As used herein, the term "virtual" specifies that neither the requisite devices nor the network is physically accessible to users. Further, in accordance with this embodiment, the hosting process may be initiated or terminated by users at will.

User Interface

In operation, client 142 wishing to allocate resources or create a computing environment connects to a web site served up by server system 144 and provided by Design2Deploy, Inc. System 144 serves up a number of user interfaces to configure the desired resources, as illustrated with reference to the following tables. In a first embodiment, the user interfaces include forms, or other data-entry fields which prompts client 142 to fill in the forms to obtain the desired information. Table I below illustrates the contents of a main user interface which is served up upon a request by client 142 for access to system 144.

TABLE I

Main page

1. Create a new account
2. Log into an account

As shown, option 2 permits client 142 to log into an account that was previously created. System 144 performs username and password authentication to enable client 142 to view the account. It should be noted that system 144 allows each client to access only that clients' account information. Clients are not free to navigate into another clients web environment to view or allocate resources for another account. When selected, option 1 enables a user interface for creating a new account as showing in Table II, below. The client who created the account is identified as the "owner" of the account. Preferably, each account is associated with only one owner only whom is authorized to change the licensing and billing information for the account.

Other criteria for creating a new account includes the specification of a "licensing plan" by client 142. A "licensing plan" as used herein describes the type and scope of services offered by system 144. For example, a licensing plan "A" may include a selection of five Pentium III processors running on a Microsoft Windows NT platform, 50 client-server licenses and 4 disk arrays at a specific bandwidth and capacity.

Client 142 must also specify billing information when creating a new account. Such information can be an account number or a credit card number, for example. Table II illustrates the content of the user interface for creating a new account.

TABLE II

| Create a new account | |
| --- | --- |
| Enter new account name: | <accountName> |
| Enter login name: | <loginName> |
| Enter password: | <password> |
| Retype password: | <password2> |
| Enter your name: | <name> |
| Enter email address: | <email> |
| Enter licensing plan: | <licensePlan> |
| Enter billing info: | <billingInfo> |

Following the creation of a new account, a "laboratory" configuration user interface is served up as illustrated in Table III, below.

TABLE III

| Lab page | |
| --- | --- |
| 1. Edit licensing info | (owner only) |
| 2. Edit billing info | (owner only) |
| 3. Show billing info | |
| 4. Add a user | (owner and administrators only) |
| 5. Delete a user | (owner and administrators only) |
| 6. Change my password | |
| 7. Add a machine | |
| 8. Delete a machine | |
| 9. Add a subnet | |
| 10. Delete a subnet | |
| 11. Open a window on a machine | |
| 12. Shutdown | |

It should be observed that options 1 and 2 are reserved for owners only while options 4 and 5 are accessible to both owners and administrators. Option 1 in table III, allows editing and modification of licensing information as proves necessary. In one embodiment, an error message is generated when client 142 attempts to modify the licensing information in a manner that is inconsistent with the terms of the current laboratory.

Option 3 in Table III, enables client 142 to view information related to a current or past bill. This information may include the number of CPU hours of active machines, the limits to the number of machines allowed and the total amount, for example.

Option 4, Table III allows client 142 to add a new user. As shown below, Table IV illustrates the content of a user interface for adding new users. System 144 restricts access to this portion of the system to only owners and administrators. An administrator as used herein, has all user privileges and can modify/delete both user and administrator accounts.

TABLE IV

| Add a new user | |
| --- | --- |
| Enter login name: | <LoginName> |
| Enter password: | <password> |
| Retype password: | <password2> |
| Enter user's name: | <name> |
| Enter user's email address: | <email> |
| Should user be an administrator? [y/n]: | <isAdmin> |

Option 5 in Table III enables users to be deleted. As in option 4 of table III, access is limited to only owners and administrators. Option 6 enables password modification by client 142.

When option 7 is selected, a daughter user interface for adding a machine is presented to client 142, as shown in table V below. Herein lies a first advantage of the present invention.

Option 7 allows client 142 to instantaneously create a configurable, secure, and distributed computer environment in accordance with the present invention. Client 142 may create or configure any type of computer environment which includes a desired selection of hardware, software and applications. Advantageously, where client 142 desires to learn about an operating system for example, client 142 may configure a Sun Microsystems® box with the desired operating system platform, such as a Microsoft Windows® environment (80, 95, 98, 2000).

In a similar fashion, for many users, and developers in particular, this is an invaluable tool. A developer may wish to ascertain the functionality of software in multiple computer environments. The computer environments used for testing must be clean, in the sense that the environment has only original software which are not modified, e.g., by later installed applications, for example. With the present invention, operating systems such as Windows 95®, 2000®, Linux 6.2® and Solaris® for example, are installable to create a clean computer environment for testing purposes.

In this manner, the developer may test code using the present embodiment without the disadvantages associated with using a tainted computer environment. Many other benefits of the present invention will become apparent to one of ordinary skill in the art with reference to descriptions and drawings which follow. As shown in exemplary table V, a CPU type, OS type, a subnet and applications used are selectable by client 142 to allocate resources as desired.

TABLE V

| Add a new machine | |
| --- | --- |
| Enter CPU type: | <cpuType> |
| Enter OS type: | <osType> |
| Enter owning subnet: | <subnet> |
| Is gateway for subnet [y/n]: | <isGateway> |
| Enter hostname: | <hostname> (optional) |
| Enter applications used: | <apps> |

Option 8, in Table III enables a named machine to be deleted. For example, where a CPU type and an operating system for a particular host name were previously configured, option 8 allows client 142 to delete the particular machine. Some safeguards are built into the system to prevent deletion of a host machine if other client's have open windows on the machine. This rule, however, is inapplicable to owners and system administrators who can shut down such active machines.

TABLE VI

| Add a new subnet | |
| --- | --- |
| Enter owning subnet: | <parentSubnet> |
| Enter subnet name: | <subnetName> (optional) |

Option 9 in Table III is for the purpose of adding a new subnet. Table VI illustrates the content of the usual interface for adding a new subnet. A "subnet" as used herein is defined as all of the machines at one geographic location, in one building, or on the same local area network (LAN). Client 142 must specify which subnet the selected subnet is nested within. The computing environment itself may be specified for this field, and it may be indicated that the subnet is in the root subnet and is not connected any other subnets. As a default, server system 144 generates a name for the subnet if client 142 fails to specify a name.

TABLE VII

| Delete a subnet | |
| --- | --- |
| Enter subnet name: | <subnetName> |

Option 10 in Table III, enables the deletion of a previously selected subnet. System 144 prevents the deletion of a subnet that contains active machines. The user interface for this option is illustrated above in Table VII.

TABLE VIII

| Open a window on a machine | |
| --- | --- |
| Enter machine name: | <hostname> |

Selection of option 11 in table III pops up a different window showing the desktop for the requested machine, if a machine has been activated. Otherwise, if a requested machine has not been activated, it is activated and the window is opened. In addition, all gateway machines of enclosing subnets for this machine will also be activated. Table VIII shows the contents of the "open a window on a machine" user interface. When clicked, option 12, table III shuts down one or more previously configured machines. Table IX below illustrates the user interface for shutting down a machine. In one embodiment, the shutdown user interface may provide capabilities to shut down entire subnets or the entire laboratory.

TABLE IX

| Shutdown | |
| --- | --- |
| Enter machine name: | <hostname> |

Table X illustrates a login user interface through which client 142, if previously registered, may access system 144. Access is authorized only if client 142 is any one of an owner, administrator, and a user. Administrators have all the privileges that users have and can delete user and administrator accounts. Owners have all of the privileges that administrators do and can change licensing and billing information.

TABLE X

| Login Page | |
| --- | --- |
| Enter account name: | <accountName> |
| Enter login name: | <LoginName> |
| Enter password: | <password> |

Table X illustrates a login user interface for logging into system 144 for a previously registered client. Access to system 144 is permitted only if client 142 is any one of an owner, administrator, and a user. Administrators have all of the privileges that users have and can delete user and administrator accounts. Owners have all of the privileges that administrators do. A "gateway machine" is defined as a machine that acts as a network point to a network or subnetwork. In one embodiment, the gateway machine may act as a proxy server or a firewall server. Server system 144 may fail to activate a machine or its gateway in some circumstances. Such circumstances include insufficient hardware resources, insufficient operating systems or not enough application licenses for the requested resources. In this case, system 144 generates and displays the appropriate error.

N-Tier Architecture

Figure 2:
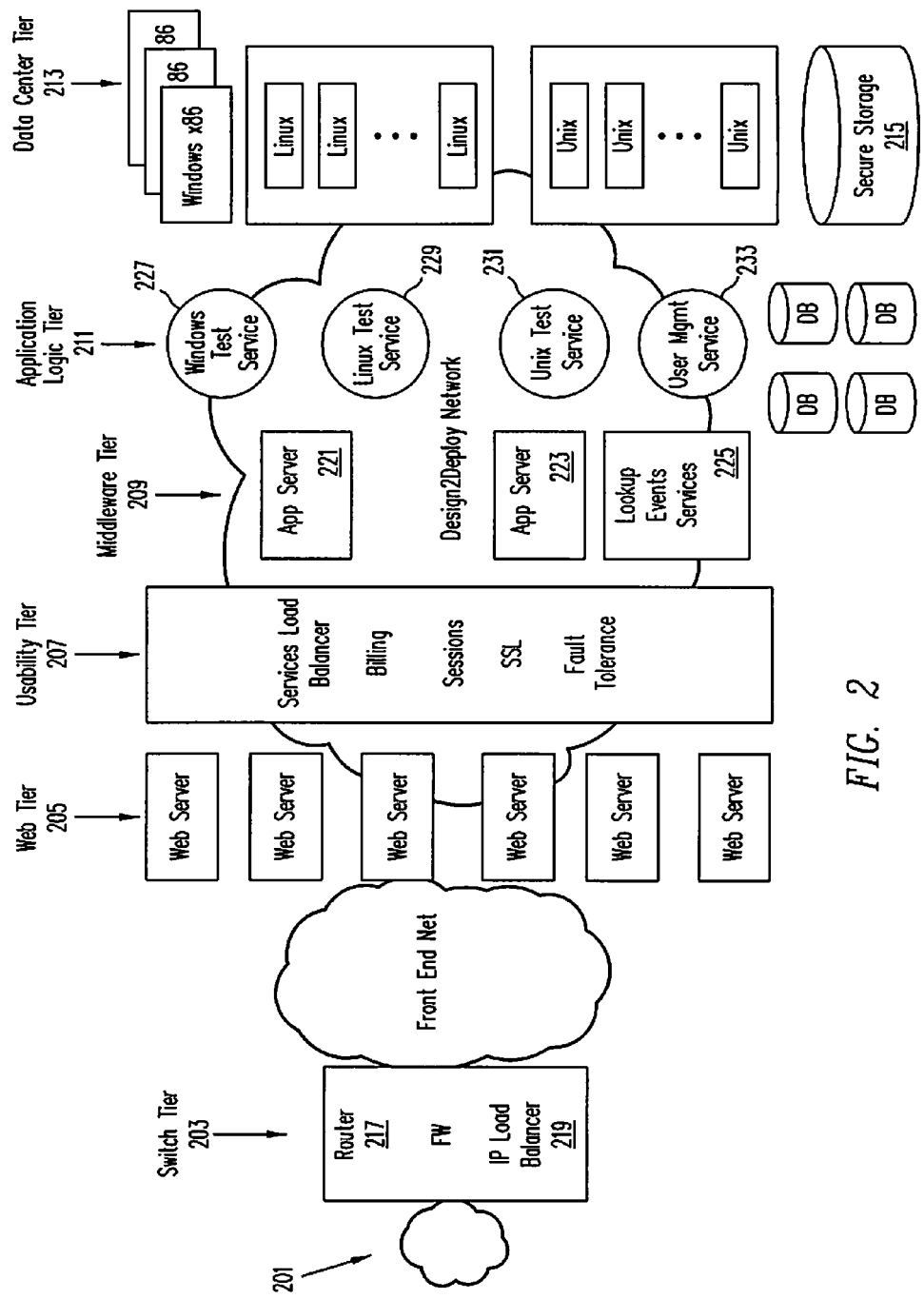
FIG. 2 is a block diagram of system having a tier architecture for allocating processing resources according to the present invention.

FIG. 2 is a block diagram of D2D System 200 having a tier architecture according to the present invention.

In FIG. 2, system 200 comprises a number of tiers, namely switch tier 203, web 205 and usability tier 207. Other tiers include middleware tier 209, application logic tier 211 and data center tier 213. One or more of the tiers are implementable using software (dedicated custom or third-party), or hardware or a combination of both. Switch tier 203 includes a router 217 for routing data packets through the network, an FW and a balancer 219 for balancing internet protocol loading. Router 217 may be a Cisco 7200 Series™ router available from Cisco, Inc.® or other comparable type routers. Web tier 205 comprises a plurality of web servers such as a Sun Microsystems® box running an iPlanet™ web server, enterprise edition 4.1 for example, or other comparable type web servers. Usability tier 207 provides various services including load balancing, building, session managing, SSL and fault tolerance.

Middleware tier 209 contains one or more application servers 221, 223 and a module 225 for implementing look up event and services. Application server 221 may be DEA web logic server™ running within a Windows NT® platform, for example. Application logic tier 211 provides a variety of operating systems test services such as Windows 227, Linux 229, Unix 231 test services. User management service 233 is implemented within application logic tier 211. Data center tier 311 includes various operating system platforms and processors, also selectable by the user. Data center tier 311 in one embodiment is removed from the application logic tier 211. Although not shown, one of ordinary skill in the art will realize that one or more of the aforementioned tiers and components therein are implementable using third party providers, dedicated custom modules or software and hardware or a combination thereof.

Figure 3:
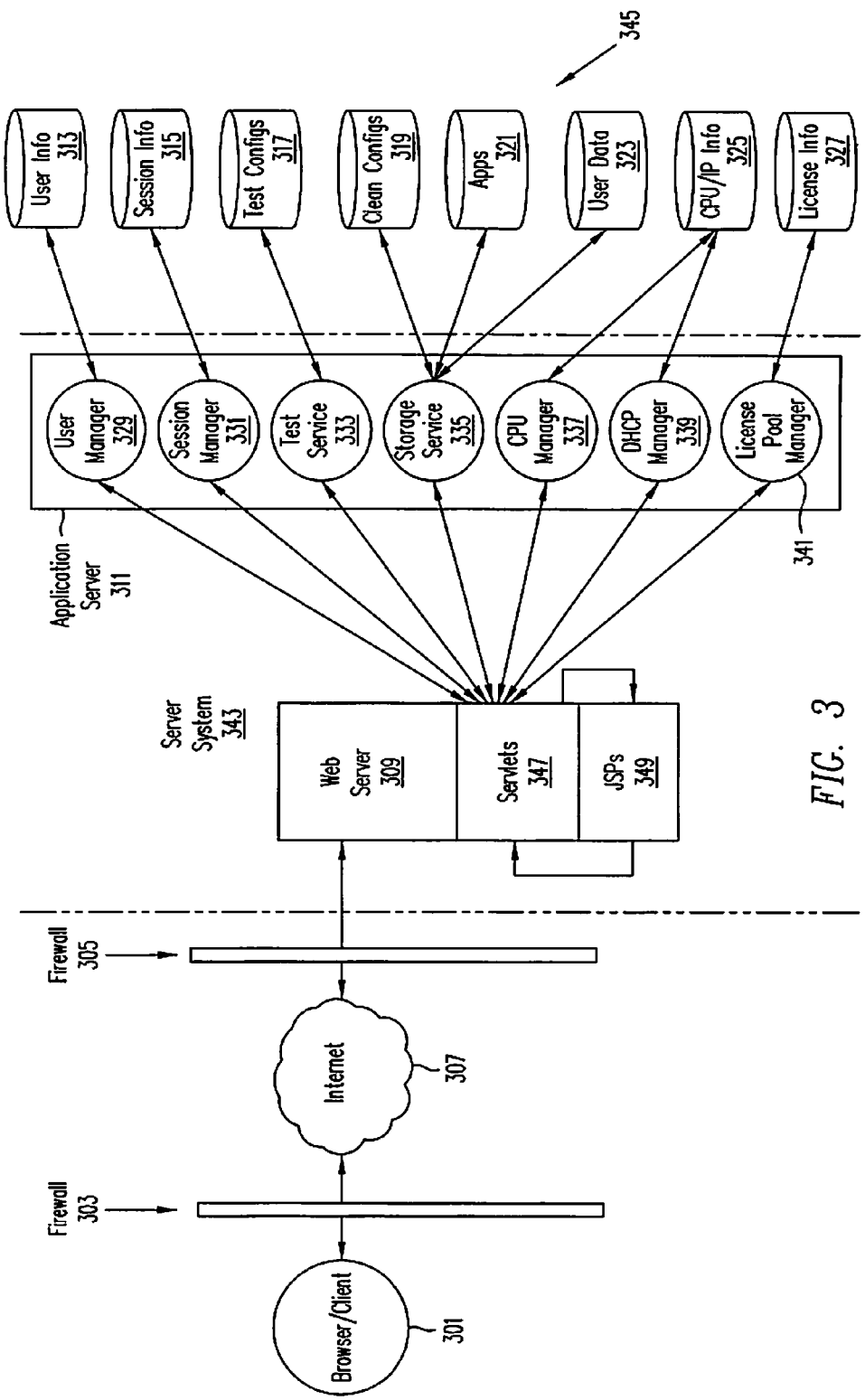
FIG. 3 is an exemplary block diagram of a system showing exemplary service layers in accordance with the present invention.

FIG. 3 is a block diagram of D2D System 300 showing exemplary service layers in accordance with the present invention. As shown, system 300 comprises client 301, communicatively coupled through the Internet 307, to server system 343. In FIG. 3, firewalls 303 and 305 maintain security within a client network and the server system 343, respectively. In a simple configuration shown in FIG. 3, server system 343 comprises web server 309, application server 311 and a plurality of databases 345. Web server 309 includes JSPs (Java server pages) 349 which coordinate with servlets 347 to generate the user interfaces seen by the user. Although the user interfaces receive information (e.g. commands to open windows or to shut down machines), they may display information such as account and user information, machine configuration information, acknowledgments, error and state information, for example. These functionalities are accomplished, at least in part, through communication with a session manager 331. In one embodiment, the communication (with session manager 331) uses XML (extensible markup language) or other comparable low-level code.

As shown in FIG. 3, application server 343 functions to run a plurality of services namely, a user manager 329, a session manager 331, a test service manager 333 and a storage service manager 335. Others include a CPU manager 337, DHCP manager 339 and license pool manager 341. Although not shown, each of the aforementioned services are operable in a distributed environment having one or more servers and computing systems.

User manager 329 is responsible for holding all user account information specific to single user. Such information includes the login name, password, user name and email address for the user. It will be apparent to one of ordinary skill in the art that additional information fields may be added to a user account as proves necessary. Such fields may be the machine login name and the user identification, for example. User beans are uniquely identified using the tuples: (account name, login name).

Session manager 331 is the intermediary between client 142 (FIG. 1) and server system 343. All requests from and responses to client 142 involve session manager 331. In one embodiment, session manager 331 solely functions to route these messages and replies between the appropriate managers and client 142. Therefore, session manager 331 performs little or no computations and has no state. Implementation of session manager 331 may be achieved using a Java session bean, in one embodiment. A "bean" as herein used refers to a component which is a reusable program building block that can be combined with other components in the same or other computers in a distributed network to form an application.

Test services manager 333 functions to map physical machines to a laboratory configuration that indicates a user's virtual selection of allocateable resources. Test services manager 333 acts as an intermediary between various sub-managers responsible for setting up, shutting down and accessing physical machines and a configuration manager (not shown). The configuration manager functions to manage various configuration operations, including implementation of configurations, creation of "beans" (discussed subsequently), the allocation of other resources, and so on. Like the user manager 329, test services manager 333 has no state, and its primary purpose is to coordinate operations between other managers. Additionally, test services manager 333 may roll back one or more previously completed services if an invoked service fails. It is also responsible for updating the state of all machines and subnets. However, it should be noted that a machine's status will only be updated to up or down when test services manager 333 is fully completed.

In an exemplary embodiment, test services manager 333 delegates certain operations initiated by session manager 331 to other sub-managers. The operations are (1) startup of a machine; (2) shutdown of a machine; (3) shutdown of the entire lab; and (4) opening a machine window.

The sub managers to which these operations are delegated include a startup service sub manager (not shown) and a storage service sub manager (not shown). As implied by its name, the startup service sub manager functions to startup and shut down machines. Upon identifying the appropriate machines for starting up or shutting down, it directs CPU manager 337 to execute the task. After a set of machines are started up, for example, the sub manager will return those machines in a vector so that those machines can be shut down if a rollback is needed. The startup service sub manager is also responsible for keeping track of the number of operating system licenses available in the license manager (described below) and updating the number of running machines within system 343. An addition function of the startup service sub manager is to communicate with DHCP manager 339 to both allocate and free IP addresses for the machines. The storage service sub manager is responsible for mounting and unmounting the shared persistent storage on the machines. This functionality is achieved by communicating and coordinating with storage service manager 335.

Other sub managers to which tasks are delegated by the test service manager are a login service sub manager (not show) and an application service sub manager (not shown) for installing and uninstalling applications on the user selected machines. The applications sub manager keeps in contact with license pool manger 341 to update the number of licenses. The application sub manager will invoke the CPU service manager 337 or an application service manager (depending on the implemented embodiment) to perform the installs and uninstalls. Alternately, neither the application service sub manager or manager is implemented so that all installs/uninstall are performed by the startup service sub manager.

With regard to the login service sub manager, it functions to login a user into a machine and pops a VNC window of the machine's desktop for the user by coordinating with a login manager (not shown). It should be observed that one or more of the aforementioned sub managers are implemented as stateless session beans so that some variables are cached. Additionally, although not shown one of ordinary skill in the art will realize that one or more of the sub managers and associated functionalities may be combined, or implemented as other service layers consistent with the spirit and scope of the present invention.

In FIG. 3, storage service manager 335 functions to keep track of all of the shared storage in a session. Storage service manager 335 allocates storage for a particular laboratory, and mounts/unmounts this storage on all of the machines in the laboratory. Storage manager 335 only interacts directly with the storage service sub manager (of test service manager 333). Storage service manager 335 typically has a daemon running on each machine within system 343 and it will communicate these daemons through a look up service. In one embodiment, the interface between storage service manager 335 and the storage service sub manager is implemented as a session bean.

CPU manager 337 functions to track the machines that are within system 343 as well as to assign one or more of these machines as virtual machines. When the start up service sub manager requests a machine with a particular CPU and operating system, CPU manager 337 locates such a machine and, if need be, installs the proper operating system on the machine. CPU manager 337 further functions to return a machine into a free pool when released by start-up service. In addition, if an actively used machine crashes, CPU manager 337 informs the start up service manager that such a crash occurred. Each machine in System 343 runs a CPU-based daemon to keep track of the active and running machines. A look up service will be utilized to perform this functionality. It should be noted that the interface between the CPU manager 337 and the rest of D2D system 300 is implemented as a session bean.

DHCP manager 339 functions to retrieve and free IP addresses. System 343 allocates an IP address for a machine just before it is started up and frees the address after the machine shuts down.

License pool manager 341 keeps track of the number of operating systems and application licenses utilized by system 343. Each operating system and application license has a maximum number of licenses. License pool manager 341 prevents system 341 from exceeding the number of allocated licenses. Each license in license manager 341 is implemented as an entity bean. As shown in FIG. 3, the aforementioned services utilize one or more databases for storing their associated information. In a first embodiment, these databases utilize a database server running SQL 7.0 database server software by Microsoft and hosts additional databases each serving specific functions. Further, these database architecture contains an underlying ODBC-compliant Microsoft SQL Server database allowing for platform-independent data transfer but may operate with any ODBC compliant database.

In FIG. 3, information database 313 stores user information for user manager service 329, a database 315 stores information relating to sessions 91 for session manager 331, a test configuration database 317 stores associated information relating to test configuration data and is to storage service manager 335. Databases 321, 323 and 325 store applications, user data and CPU and IP address information, respectively, for storage service manager 335. Database 325 is coupled to DHCP manager 339 as well. A database 327 for storing licensing information is communicatively coupled to license pool manger 341.

The primary company Design2Deploy, Inc., of Sunnyvale, Calif. offers various products/services namely zap!Safe™ zap!Test™ service and zap!Deploy™ which will be described with reference to FIG. 4, below.

Figure 4:
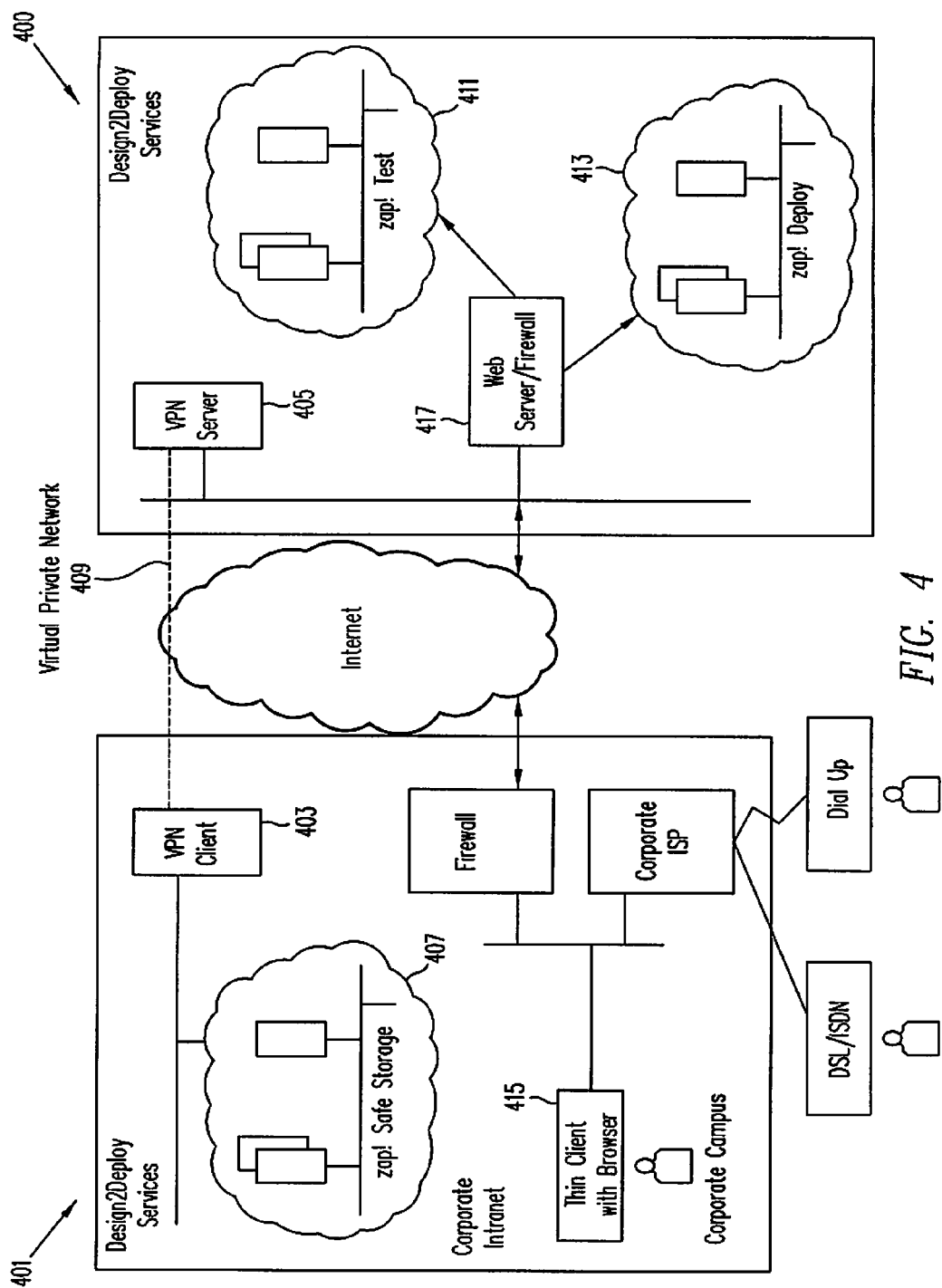
FIG. 4 is a schematic block diagram of a system for providing various services to client network in a secure and distributed environment.

FIG. 4 is a schematic block diagram of D2D system 400 for providing various services to client network 401 in a secure and distributed environment. A VPN (virtual private network) client 403 within client network 401 may request zap!Safe™ storage 407 from a VPN server 405 (of system 400). Storage 407 offers persistent storage capabilities within a VPN 409 that are accessible from all testing and deployment configurations. In one embodiment, storage 407 offers a single site to store all mission critical data and applications for an extended period of time, and features full back-up, disaster recovery and encryption facilities.

A number of other services are offered by system 400 namely zap!Test service 411 and service 413. Corporate internet 415 may request service 411 which offers click and go testing configurations for various hardware, software and operating systems, and zap!Deploy™ 413 services for enabling on-the-fly (beta site) deployment and staging capabilities for various operating system platforms.

Figure 5:
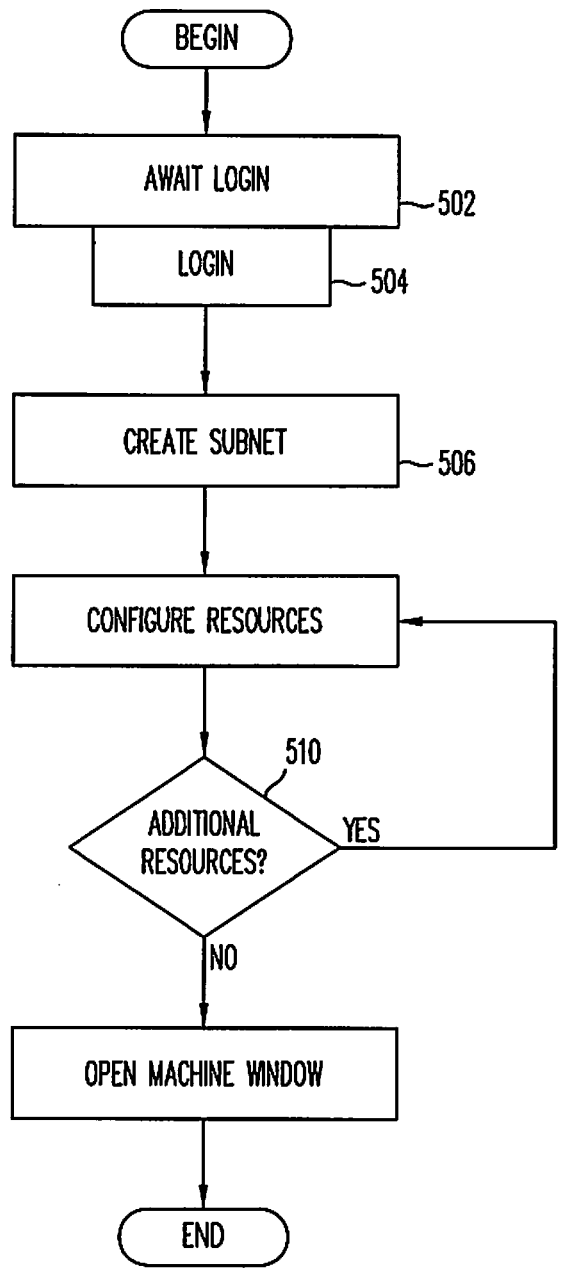
FIG. 5 is a flow chart for describing the basic steps performed by a server system to allocate system resources in response to user interaction according to the present invention.

FIG. 5 is a flow chart for describing the basic steps performed by server system 144 to allocate system resources in response to user interaction.

At step 502, server system 144 awaits user input. In one embodiment, user input is via a user input device coupled to a processor and display device of a computer. The user operates the computer to access server system 144 over the Internet. The computer can accept signals from the user input device to indicate the preferences of the user.

Server system 144 receives the signals via web page information that includes forms, or other data-entry fields, and prompts the user to fill the form to obtain the desired information. Although not shown, the web interface may be solely graphical, textual or a combination of both. In FIG. 5, the flowchart is entered at step 502, when the user desires to allocate system resources.

At step 504, the user selects a "login option". It is assumed that a valid account has previously been opened for the USER1, under an account named ACCOUNT1, for example. Next, the user provides the user's information, namely, USER1, ACCOUNT1, and a password. Session manager 331, system server 144 creates an instance of session manager 331 for USER1. Session manager 331 locates the user bean named USER1 under ACCOUNT1 and authenticates the user identification, account and password.

Next, if USER1 has previously configured a laboratory e.g., LAB1 for ACCOUNT, it is retrieved. Otherwise, USER1 is presented with a "laboratory configuration" page. Both text and visual based examples of the "laboratory configuration" page are shown in the section entitled "User Interface" in the patent entitled "System for Configuration of Dynamic Computing Environment Using a Visual Interface", as previously included by reference herein, and more specifically, Web pages 1, 2, 3, 4, 5, 6, 6-a, 7 and 8 therein.

At step 506, USER1 creates a subnet named SUBNET1 with no parent subnet. To implement this configuration, session manager 331 directs the configuration manager to create SUBNET1 under ACCOUNT1 and LAB1, which is assigned an identification number of 1. At this point, the status of SUBNET1 is down.

At step 508, the processing resources are configured. On clicking "add a machine" on the menu option, USER1 creates a processing resource such as a x86 Linux machine running a "solitaire 2.0 application, named CLIENT1, for example, and configured under SUBNET1. Session manager 331 directs the configuration manager to create a new machine bean named CLIENT1 under ACCOUNT1 and LAB1. The machine is assigned an x86 CPU, a Linux operating system, an identification number of 2, a down status and its subnet assigned 1.

At decision box 510, USER1 may configure or add as many machines, and operating systems and software as desired. If for example, USER1 wishes to configure a server for the computing environment, USER1 clicks on "add a machine" again. USER creates a solaris machine named SERVER1, under SUBNET1 with no applications. To implement this configuration, session manager 331 directs the configuration manager to create a new bean for SERVER1 under account ACCOUNT1 and LAB1. A SPARC CPU, a solaris operating system, machine identification number 3, down status and machine subnet 1 are assigned.

At step 512, USER1 may open a window on the machines (e.g. CLIENT1) which were previously configured by selecting "open a machine window". In response, session manager 331 creates a new instance of test service manager 333 (FIG. 3) and invokes the startup service sub manager (not shown) within test service manager 333. Test service manager 333 obtains the status of CLIENT1, thereafter invokes the startup sub manager to bring up CLIENT1. The startup sub manager creates an instance of the startup service and invokes CLIENT1.

In addition, the startup service performs the following operations; (1) changes the status of the machine to "starting up"; (2) requests a Linux license from license pool manager 321; (3) requests an IP address from DHCP manager 339; (4) directs CPU manager 337 to obtain an x86 machine running Linux and to assign the IP address, and host name CLIENT1. In response, CPU manager 337 creates the machine, and returns a CPU key identifying the machine for storage in the machine's configuration, bean. Thereafter, startup service returns with a vector of all machines that were started up.

Additionally, in order to open the window for CLIENT1, the startup service sub manager creates an instance of the storage service and invokes it on all of the running machines (currently CLIENT1). The storage service checks whether the shared storage for LAB1 has been allocated. If not, storage service invokes the storage service manager 335 to create a persistent shared storage pool for this LAB1. Storage service manager 335 creates this storage pool and returns a key to the storage pool, which is stored within LAB1. Thereafter, the storage service invokes the storage service manager 335 to mount the storage pool with the given key on CLIENT1. Storage service manager 335 responds by mounting the storage pool.

A further step which must be taken to open the window for CLIENT1 includes, creating an instance of application service and invoking it on all started up machines (i.e. CLIENT1). Next, the application service sub manager requests an application license for "solitaire 2.0" and installs the application after the license is granted. After "Solitaire 2.0" is installed, the status of CLIENT1 is switched to "up." Because the machines (CLIENT1) are now up and running, the startup service sub manager opens a window CLIENT1 by creating an instance of the login service sub manager.

The login service sub manager is primarily responsible for performing the following functions: (1) checking whether ACCOUNT1 contains a valid Unix login and user ID; (2) checks whether USER1 is a valid Unix login name and that it is not being used by any other user within server system 144; (3) if USER1 exists, the login server generates a second valid username USER2; and (4) generates the user ID that is unique within the service system 144. Thereafter, the login service sub manager determines a GID (group identification) from the storage pool key, and generates a UID (user identification) that is unique within the server system 144.

The login service sub manager determines the GID from the storage pool key, and directs the login manager to log in USER2 with the given UID and GID into the machine CLIENT1. The login manager checks whether user USER2 exists as a user on CLIENT1. If USER2 does not exist, USER2 is created with the given UID, GID and with no password. Next, the login manager checks whether a home directory for USER2 was allocated in the shared pool.

If unallocated, a home directory and the shared storage pool are created for USER2. The password file for USER2 is updated to use this home directory as USER2's home directory. Next, the login manager starts the VNC server daemon and returns the URL (uniform resource locator) to access the VNC server. In turn, test service manager 333 returns the URL to access the VNC server.

In this manner, the present invention permits JSP page 349 or servlet 347 (FIG. 3) to pop up a daughter window in the browser with the URL address. In the daughter window, the desktop for CLIENT1 is seen by USER1 such that USER1 may interact with CLIENT1 to carry out one or more tasks such as code testing (for example), in accordance with the present invention.

Although the present invention has been discussed with respect to specific embodiments, one of ordinary skill in the art will realize that these embodiments are merely illustrative, and not restrictive, of the invention. The scope of the invention is to be determined solely by the appended claims.

What is claimed is:

1. A method in a computer system comprising:
    creating a first computing environment, wherein
        the creating comprises
            selecting a first processing resource to be added to the first computing environment, wherein
                the first processing resource is configured according to a first configuration received from a first source,
                the first processing resource comprises a first discrete processor,
                the first configuration specifies a first type of processor, and
                the first discrete processor is of the first type of processor, and
            selecting a second processing resource to be added to the first computing environment, wherein
                the second processing resource is physically separate from the first processing resource,
                the second processing resource is configured according to the first configuration received from the first source,
                the second processing resource comprises a second discrete processor,
                the first configuration specifies a second type of processor, and
                the second discrete processor is of the second type of processor;
    providing the first computing environment for a first time period, wherein
        the first computing environment provides the first discrete processor and the second discrete processor as specified by the first configuration;
    creating a second computing environment, wherein
        the second computing environment comprises the first processing resource configured according to a second configuration,
        the second configuration specifies the first type of processor, and
        the second configuration represents a configuration received from a second source; and
    providing the second computing environment for a second time period, wherein
        the first time period and the second time period are mutually exclusive.

2. The method of claim 1, wherein
    the first processing resource comprises a processing platform,
    the second computing environment further comprises the second processing resource configured according to the second configuration,
    the second processing resource comprises a software component, and
    the first configuration further specifies a type of the software component.

3. The method of claim 2, further comprising:
    accepting a first input from a user input device, wherein
        the first input selects the processing platform from a plurality of processing platforms;
    accepting a second input from the user input device, wherein
        the second input selects the software component from a plurality of software components; and
    automatically installing the software component on the processing platform.

4. The method of claim 3, wherein the software component is one of
    a server component, or
    a client component.

5. The method of claim 3, wherein
    each processing platform of the plurality of processing platform tracks active processing platforms included in the dynamic computing environment.

6. The method of claim 2, further comprising:
    automatically managing a license for the software component.

7. The method of claim 2, wherein
    the first computing environment comprises a first plurality of processing resources,
    the first plurality of processing resources comprises the first and second processing resources,
    the second computing environment comprises a second plurality of processing resources, and
    the second plurality of processing resources comprises the first and second processing resources.

8. The method of claim 7, wherein
    the first and second plurality of processing resources comprise additional hardware and software components.

9. The method of claim 1, further comprising:
    displaying a graphical user interface on a display device of a computer system, wherein
        the first and second computing environments are created using the graphical user interface.

10. The method of claim 9, wherein
    the graphical user interface facilitates construction of the first and second computing environments.

11. The method of claim 1, further comprising:
configuring the first processing resource according to the first configuration; and
configuring the first processing resource according to the second configuration.

12. The method of claim 11, further comprising:
displaying a list of processing resources in a graphical user interface;
accepting a first input indicating the first processing resource and the first configuration; and
accepting a second input indicating the first processing resource and the second configuration.

13. The method of claim 1, further comprising:
controlling access to the first and second computing environments via a graphical user interface, wherein
the first and second computing environments are controlled using account information.

14. The method of claim 13, wherein
the account information indicates whether said access includes permission to create or modify the first computing environment or the second computing environment.

15. The method of claim 1, wherein
the first configuration identifies a first processing platform for the hardware component, and
the second configuration identifies a second processing platform for the hardware component.

16. The method of claim 1, further comprising:
accepting a first input from a user input device, wherein
the first input selects the type of the hardware component from a plurality of types of hardware components.

17. The method of claim 1, wherein
the creating the first computing environment comprises
selecting the first discrete processor out of a plurality of discrete processors, wherein
the selecting is based, at least in part, on the first configuration.

18. The method of claim 1, wherein
a software component is configured to be installed using the first discrete processor.

19. The method of claim 1, wherein
a software component is configured to be executed, during the first time period, using the first discrete processor.

20. The method of claim 1, wherein
the selecting the first processing resource comprises specifying a first host-name associated with the first processing resource, and
the selecting the second processing resource comprises specifying a second host-name associated with the second processing resource.

21. The method of claim 1, further comprising:
selecting a first subnet, wherein
the first subnet comprises a plurality of computers at a first geographic location; and
adding the first subnet to the first computing environment.

22. A non-transitory computer readable storage medium comprising instructions executable to:
create a first computing environment, wherein
creating the first computing environment comprises
selecting a first processing resource to be added to the first computing environment, wherein
the first processing resource is configured according to a first configuration received from a first source,
the first processing resource comprises a first discrete processor,
the first configuration specifies a first type of processor, and
the first discrete processor is of the first type of processor, and
selecting a second processing resource to be added to the first computing environment, wherein
the second processing resource is physically separate from the first processing resource,
the second processing resource is configured according to the first configuration received from the first source,
the second processing resource comprises a second discrete processor,
the first configuration specifies a second type of processor, and
the second discrete processor is of the second type of processor;
provide the first computing environment for a first time period, wherein
the first computing environment provides the first discrete processor and the second discrete processor as specified by the first configuration;
create a second computing environment, wherein
the second computing environment comprises the first processing resource configured according to a second configuration,
the second configuration specifies the first type of processor, and
the second configuration represents a configuration received from a second source; and
provide the second computing environment for a second time period, wherein
the first time period and the second time period are mutually exclusive.

23. The non-transitory computer readable storage medium of claim 22, wherein
the first processing resource comprises a processing platform,
the second computing environment further comprises the second processing resource configured according to the second configuration,
the second processing resource comprises a software component, and
the first configuration further specifies a type of the software component.

24. The non-transitory computer readable storage medium of claim 23, wherein the program instructions are further executable to:
accept a first input from a user input device, wherein
the first input selects the processing platform from a plurality of processing platforms;
accept a second input from the user input device, wherein
the second input selects the software module from a plurality of software modules; and
automatically install the software module on the processing platform.

25. The non-transitory computer readable storage medium of claim 22, wherein the program instructions are further executable to:
configure the first processing resource according to the first configuration; and
configure the first processing resource according to the second configuration.

26. The non-transitory computer readable storage medium of claim 25, wherein the program instructions are further executable to:
display a list of processing resources in a graphical user interface;

accept a first input indicating the first processing resource and the first configuration; and accept a second input indicating the first processing resource and the second configuration.

27. A computer system comprising:

one or more processors; and memory coupled to the one or more processors, wherein the memory stores program instructions executable by the one or more processors to:

the creating comprises selecting a first processing resource to be added to the first computing environment, wherein the first processing resource is configured according to a first configuration received from a first source, the first processing resource comprises a first discrete processor, the first configuration specifies a first type of processor, and the first discrete processor is of the first type of processor, and selecting a second processing resource to be added to the first computing environment, wherein the second processing resource is physically separate from the first processing resource, the second processing resource is configured according to the first configuration received from the first source, the second processing resource comprises a second discrete processor, the first configuration specifies a second type of processor, and the second discrete processor is of the second type of processor;

provide the first computing environment for a first time period, wherein the first computing environment provides the first discrete processor and the second discrete processor as specified by the first configuration;

create a second computing environment, wherein the second computing environment comprises the first processing resource configured according to a second configuration, the second configuration specifies the first type of processor, and the second configuration represents a configuration received from a second source; and provide the second computing environment for a second time period, wherein the first time period and the second time period are mutually exclusive.

28. The system of claim 27, wherein the first processing resource comprises a processing platform, the second computing environment further comprises the second processing resource configured according to the second configuration, the second processing resource comprises a software component, and the second processing resource comprises a software module.

29. The system of claim 28, wherein the program instructions are further executable to:

accept a first input from a user input device, wherein the first input selects the processing platform from a plurality of processing platforms;

accept a second input from the user input device, wherein the second input selects the software module from a plurality of software modules; and automatically install the software module on the processing platform.

30. The system of claim 27, wherein the program instructions are further executable to:

configure the first processing resource according to the first configuration; and configure the first processing resource according to the second configuration.

31. The system of claim 30, wherein the program instructions are further executable to:

display a list of processing resources in a graphical user interface;

accept a first input indicating the first processing resource and the first configuration; and accept a second input indicating the first processing resource and the second configuration.

* * * * *